US012368285B2

(12) United States Patent
Kawabe et al.

(10) Patent No.: US 12,368,285 B2
(45) Date of Patent: Jul. 22, 2025

(54) SPARK PLUG

(71) Applicant: Niterra Co., Ltd., Nagoya (JP)

(72) Inventors: Ayato Kawabe, Nagoya (JP); Haruki Yoshida, Nagoya (JP); Kengo Fujimura, Nagoya (JP); Takeshi Sakuma, Nagoya (JP)

(73) Assignee: Niterra Co., Ltd., Nagoya (JP)

( * ) Notice: Subject to any disclaimer, the term of this patent is extended or adjusted under 35 U.S.C. 154(b) by 0 days.

(21) Appl. No.: 18/611,802

(22) Filed: Mar. 21, 2024

(65) Prior Publication Data

US 2024/0332916 A1 Oct. 3, 2024

(30) Foreign Application Priority Data

Mar. 29, 2023 (JP) ................................. 2023-052491

(51) Int. Cl.
*H01T 13/34* (2006.01)
*H01T 13/20* (2006.01)

(52) U.S. Cl.
CPC ............ *H01T 13/34* (2013.01); *H01T 13/20* (2013.01)

(58) Field of Classification Search
CPC .......................... H01T 13/34; H01T 13/20–38
See application file for complete search history.

(56) References Cited

U.S. PATENT DOCUMENTS 7,443,089 B2 * 10/2008 Hoffman ................. H01T 13/41 313/141
7,598,661 B2 * 10/2009 Walker, Jr. ........ C04B 35/62695 501/127
9,590,395 B2 * 3/2017 Takaoka .................. H01T 13/05
9,614,354 B2 * 4/2017 Yoshida .................. H01T 13/41
12,095,233 B1 * 9/2024 Tamura .................... H01T 21/02
12,095,234 B2 * 9/2024 Sakuma .................. H01T 21/02
2007/0228915 A1 * 10/2007 Honda .................... H01T 13/38 313/143
2013/0175922 A1 * 7/2013 Yoshida .................. H01T 21/02 445/7
2015/0069902 A1 * 3/2015 Kita ........................ H01T 13/34 313/130
2018/0166861 A1 * 6/2018 Kurosawa ............ C01G 53/006
2022/0140575 A1 * 5/2022 Walker, Jr. ............. H01B 19/00 174/137 B

FOREIGN PATENT DOCUMENTS

JP 2022-190529 A 12/2022
JP 2022190528 A * 12/2022
WO WO-2022265008 A1 * 12/2022 ............. H01T 13/20

* cited by examiner

*Primary Examiner* — Colin J Cattanach
(74) *Attorney, Agent, or Firm* — Renner, Otto, Boisselle & Sklar, LLP

(57) ABSTRACT

A spark plug includes a sealing material disposed around a center electrode in an insulator. On a cross section including a center line of an axial hole, one of long sides of a rectangle is set into the insulator along the center line. The rectangle is divided into 20 equal regions in the insulator by dividing each of short sides of the rectangle into two equal parts and dividing each of the long sides of the rectangle into 10 equal parts. The rectangle has a porosity of 5% or less. Among pores that appear in each of the regions, 10 pores having largest areas are selected as specific pores. The specific pores have an average area of 26.3 $\mu m^2$ or less. The specific pores include no more than 30 pores having areas of 37 $\mu m^2$ or more and no less than eight pores having areas of 51 $\mu m^2$ or more.

2 Claims, 3 Drawing Sheets

[Fig. 1]
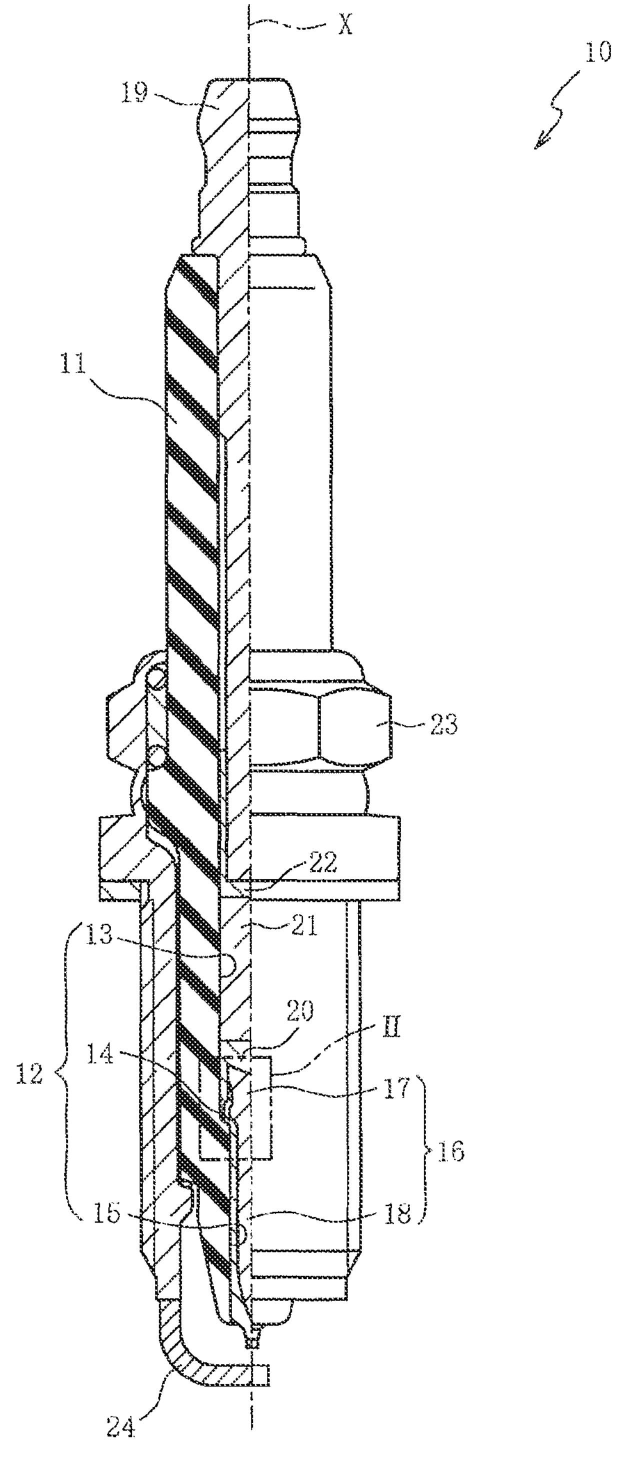

[Fig. 2]
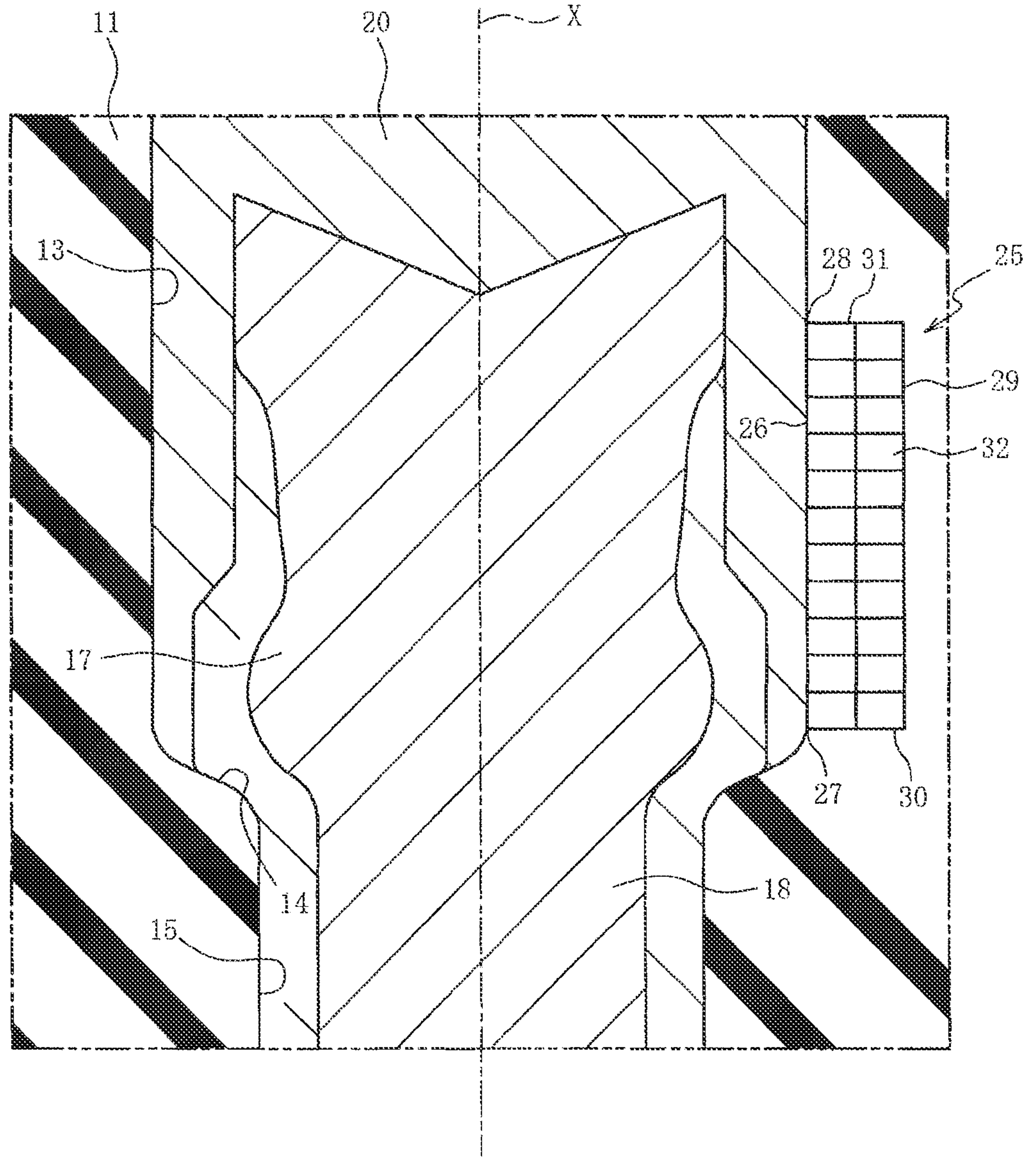

[Fig. 3]
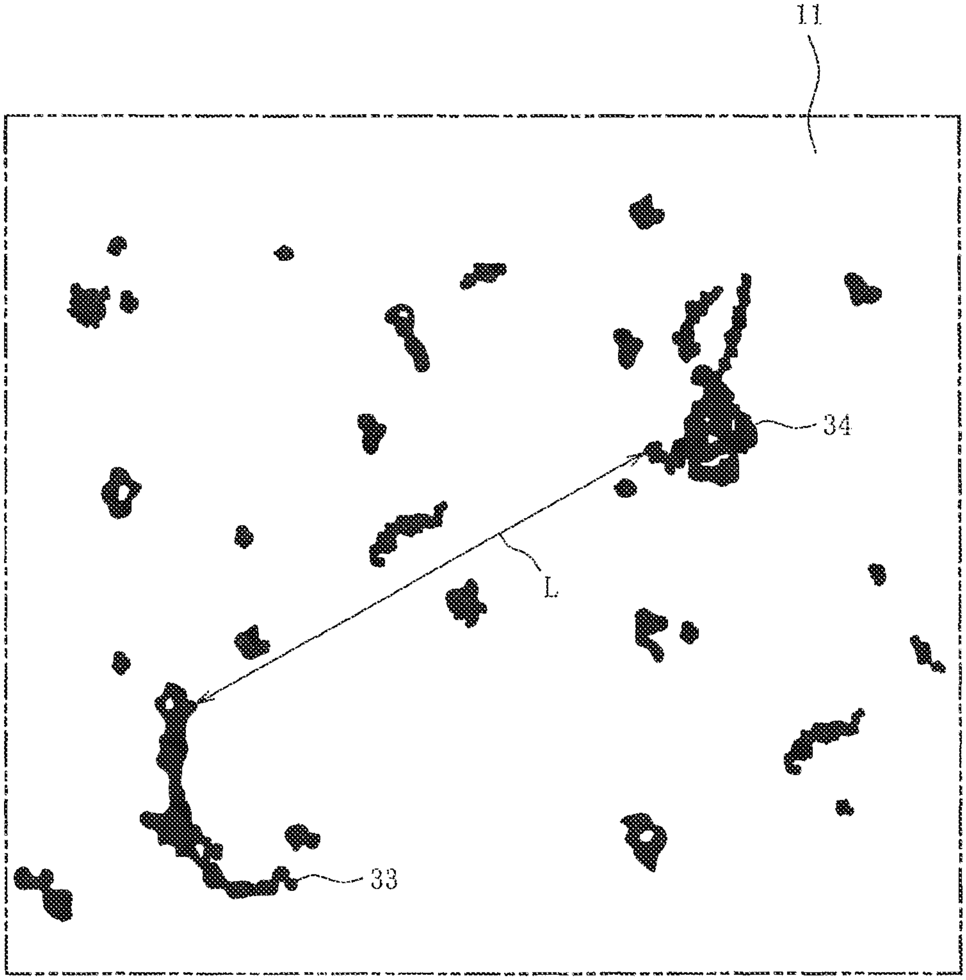

SPARK PLUG

FIELD OF THE INVENTION

The present invention relates to a spark plug including an insulator.

BACKGROUND OF THE INVENTION

Japanese Unexamined Patent Application Publication No. 2022-190529 describes a spark plug according to the related art including a center electrode fixed to an insulator by a sealing material surrounding the center electrode. To ensure that the spark plug has satisfactory insulating field strength, abnormal grain growth in the insulator is suppressed.

According to the related art, the thermal shock properties of the insulator may be degraded.

SUMMARY OF THE INVENTION

The present invention has been made to solve the above-described problem, and its object is to provide a spark plug having satisfactory insulating field strength and thermal shock properties.

To achieve the above-described object, a spark plug according to a first aspect of the present invention includes: an insulator having an axial hole including a first hole and a second hole with a diameter smaller than a diameter of the first hole, the first hole and the second hole being connected to each other in an axial direction with a connecting portion provided therebetween; a center electrode extending from the first hole toward a front end of the spark plug through the second hole; and a sealing material disposed in a rear end region around the center electrode in the insulator. On any cross section including a center line of the axial hole, a rectangle that is 1920 μm long in the axial direction and 510 μm long in a radial direction is set in the insulator, one of long sides of the rectangle having a front end in contact with a front end of the first hole and a rear end in contact with the first hole. A ratio of an area of pores that appear in the rectangle to an area of the rectangle is 5% or less. The rectangle is divided into 20 equal regions in the insulator by dividing each of short sides of the rectangle into two equal parts and dividing each of the long sides of the rectangle into 10 equal parts. Among the pores that appear in each of the regions, 10 pores having largest areas are selected as specific pores. The specific pores have an average area of 26.3 $\mu m^2$ or less. The specific pores include no more than 30 pores having areas of 37 $\mu m^2$ or more and no less than eight pores having areas of 51 $\mu m^2$ or more.

According to a second aspect, in the first aspect, the specific pores having areas of 37 $\mu m^2$ or more are separated from each other by a distance of 36.3 μm or more.

The rectangular portion that is 1920 μm long in the axial direction and 510 μm long in the radial direction is set in a cross section of the insulator adjacent to the sealing material. The rectangular portion has a porosity of 5% or less. The average area of the specific pores, which are 10 pores having the largest areas in each of the 20 equal regions included in the rectangle, is 26.3 $\mu m^2$ or less. The specific pores include no more than 30 pores having areas of 37 $\mu m^2$ or more. Therefore, satisfactory insulating field strength can be ensured. In addition, since the specific pores include no less than eight pores having areas of 51 $\mu m^2$ or more, the insulator has satisfactory thermal shock properties.

BRIEF DESCRIPTION OF THE DRAWINGS

FIG. 1 is a half sectional view of a spark plug according to an embodiment;

FIG. 2 is an enlarged sectional view of part II of the spark plug illustrated in FIG. 1; and FIG. 3 is an enlarged schematic diagram of a binarized image of a sectional surface of the insulator.

DETAILED DESCRIPTION OF THE INVENTION

A preferred embodiment of the present invention will now be described with reference to the accompanying drawings. FIG. 1 is a half sectional view showing an external view of the spark plug 10 according to the embodiment on one side of a center line X of an axial hole 12 and a sectional view of the spark plug 10 on the other side. A lower end of the spark plug 10 in FIG. 1 is referred to as a front end, and an upper end of the spark plug 10 in FIG. 1 is referred to as a rear end (this also applies to FIG. 2). The spark plug 10 includes an insulator 11 and a center electrode 16.

The insulator 11 is a cylindrical member having an axial hole 12 extending along the center line X. The insulator 11 is made of a ceramic, such as alumina, having good insulating properties and mechanical properties at high temperatures. In the present embodiment, the insulator 11 is an alumina-based sintered body. The axial hole 12 extends from the rear end to the front end of the insulator 11, and includes a first hole 13, a connecting portion 14, and a second hole 15 connected in that order. In the present embodiment, each of the first hole 13 and the second hole 15 is defined by a cylindrical surface having a constant diameter over the entire length thereof, and the connecting portion 14 is defined by a conical surface having a diameter that decreases toward the front end. The connecting portion 14 may instead be defined by a flat annular surface perpendicular to the center line X of the first hole 13 and the second hole 15. The second hole 15 has a diameter smaller than that of the first hole 13.

The center electrode 16, which is rod-shaped and made of a metal, is disposed in the axial hole 12 in the insulator 11. The center electrode 16 includes a core material having a high thermal conductivity and a base material in which the core material is embedded. The base material is a metal material composed of a Ni-based alloy or Ni. The core material is made of copper of a copper-based alloy. The core material may be omitted. The center electrode 16 includes a head portion 17 disposed in the first hole 13 in contact with the connecting portion 14 and a leg portion 18 extending from the head portion 17 toward the front end and disposed in the second hole 15. The head portion 17 and the leg portion 18 are formed integrally with together.

The metal terminal 19 is a rod-shaped member to be connected to an ignition system (not illustrated), and is made of a conductive metal material (for example, low-carbon steel). The metal terminal 19 includes a front portion disposed in the first hole 13 in the insulator 11 and a rear portion projecting from the insulator 11. The first hole 13 in the insulator 11 accommodates a sealing material 20, a resistor 21, and a sealing material 22 arranged in that order between the center electrode 16 and the metal terminal 19.

The sealing material 20 has a function of fixing the head portion 17 of the center electrode 16 to the insulator 11 and filling the first hole 13, and is disposed around the head portion 17. The sealing material 22 has a function of fixing the metal terminal 19 to the insulator 11. The sealing materials 20 and 22 are conductive and contains, for example, glass particles and metal particles (e.g., Cu or Fe) at a ratio of about 1:1. The glass particles may be made of, for example, $B_2O_3$—$SiO_2$-based, BaO—$B_2O_3$-based, or $SiO_2$—$B_2O_3$—CaO—BaO-based materials. The sealing materials 20 and 22 have thermal expansion coefficients between that of the insulator 11 made of a ceramic and that of the center electrode 16 made of a metal.

The resistor 21 is a member that reduces the electromagnetic noise generated when a spark occurs. The resistor 21 is a mixture of glass particles, which are the main component, ceramic particles other than the glass particles, and a conductive material. The material of the glass particles may be, for example, $B_2O_3$—$SiO_2$-based, BaO—$B_2O_3$-based, or $SiO_2$—$B_2O_3$—CaO—BaO-based materials. The material of the ceramic particles may be, for example, $TiO_2$ or $ZrO_2$. The conductive material may be, for example, a non-metal conductive material, such as carbon particles (carbon black), TiC particles, or TiN particles, or a metal, such as Al, Mg, Ti, Zr, or Zn. The sealing materials 20 and 22 are in contact with the resistor 21, and therefore the center electrode 16 and the metal terminal 19 are electrically connected to each other by the sealing materials 20 and 22 and the resistor 21.

The metal shell 23 is a substantially cylindrical member made of a conductive metal material (for example, low-carbon steel). The metal shell 23 surrounds an outer periphery of the insulator 11. The ground electrode 24 is a rod-shaped member made of a metal (for example, a nickel-based alloy) connected to the metal shell 23. A spark gap is formed between the ground electrode 24 and the leg portion 18 of the center electrode 16. The metal shell 23 may have more than one ground electrodes 24 connected thereto.

The spark plug 10 may be manufactured by, for example, the following method. First, the center electrode 16 is inserted into the first hole 13 in the insulator 11. The center electrode 16 is disposed in contact with the connecting portion 14 of the insulator 11 such that the head portion 17 is in the first hole 13 and that the leg portion 18 is in the second hole 15.

Next, the raw material powder of the sealing material 20 is introduced into the first hole 13 so that the space around the head portion 17 and the space closer to the rear end than the head portion 17 in the first hole 13 is filled with the raw material powder. Then, the raw material powder is preliminarily compressed by using a compression bar (not illustrated). Next, the raw material powder of the resistor 21 is introduced onto the raw material powder of the sealing material 20, and is preliminarily compressed by using the compression bar. Lastly, the raw material powder of the sealing material 22 is introduced onto the raw material powder of the resistor 21, and is preliminarily compressed by using the compression bar.

The metal terminal 19 is inserted into the first hole 13 from the rear end of the first hole 13 so that a front end portion of the metal terminal 19 comes into contact with the raw material powder of the sealing material 22. Then, for example, the raw material powders are heated to a temperature above the softening points of the glass components contained therein while the metal terminal 19 is pushed inward so that the raw material powders receive an axial load from the metal terminal 19. The raw material powders are compressed and sintered so that the sealing materials 20 and 22 and the resistor 21 are formed in the first hole 13. Next, the metal shell 23 to which the ground electrode 24 is connected is attached to the outer periphery of the insulator 11. Then, the ground electrode 24 is bent to form the spark gap between the ground electrode 24 and the center electrode 16. Thus, the spark plug 10 is obtained.

FIG. 2 is an enlarged sectional view of part II illustrated in FIG. 1 taken along a plane including the center line X of the axial hole 12 in the spark plug 10, illustrating a region including the head portion 17 of the center electrode 16. The head portion 17 disposed in the first hole 13 in the insulator 11 is surrounded by the sealing material 20. In the spark plug 10 installed in an engine (not illustrated), heat in a combustion chamber is transmitted from the leg portion 18 to the head portion 17 of the center electrode 16 (see FIG. 1), and then from the head portion 17 to the sealing material 20. The sealing material 20 has a thermal conductivity lower than that of the center electrode 16. Therefore, the thermal conductivity of the sealing material 20 serves as a bottleneck of heat conduction, and the sealing material 20 is heated.

The head portion 17 is thicker than the leg portion 18, and therefore the distance between the head portion 17 and the metal shell 23 (see FIG. 1) is less than the distance between the leg portion 18 and the metal shell 23. Therefore, the electric field between the head portion 17 and the metal shell 23 is stronger than the electric field between the leg portion 18 and the metal shell 23.

The sealing material 20 contains an alkaline component derived from the glass particles, which are the main component of the material of the sealing material 20. The insulator 11 composed of an alumina-based sintered body is highly resistant to alkali corrosion. However, when the spark plug 10 is installed in an engine and exposed to a high-temperature, high-voltage environment, the alkaline component may penetrate the insulator 11 through pores and cause a reduction in the insulating field strength. To ensure satisfactory insulating field strength, the pores in the insulator 11 in a region adjacent to the sealing material 20 will be considered.

A rectangle 25 in which the pores are to be observed with a scanning electron microscope (SEM) is set in a region of the insulator 11 adjacent to the sealing material 20. The rectangle 25 has long sides 26 and 29 that are 1920 μm long and short sides 30 and 31 that are 510 μm long. The short sides 30 and 31 of the rectangle 25 extend in a radial direction of the insulator 11. The long sides 26 and 29 of the rectangle 25 extend in an axial direction of insulator 11 such that the long side 26 has a front end 27 in contact with a front end of the first hole 13 and a rear end 28 in contact with the first hole 13. The insulator 11 has a rounded corner between the first hole 13 and the connecting portion 14. Therefore, the front end of the first hole 13 is defined as a front end of a straight portion of the first hole 13, that is, an intersection point between the rounded corner (curve) and the straight portion.

The rectangle 25 is divided into 20 equal regions 32 by dividing each of the short sides 30 and 31 of the rectangle 25 into two equal parts and dividing each of the long sides 26 and 29 into 10 equal parts. Each region 32 has short sides that are 192 μm long in the axial direction and long sides that are 255 μm long in the radial direction. The size of each region 32 is equal to the size of a field of view of the SEM.

To calculate the areas of the pores based on SEM images of a sectional surface of the insulator 11, the sectional surface of the insulator 11 is polished to an accuracy high enough to enable determination of the shapes of the pores that appear on the sectional surface. The insulator 11 has a surface roughness (Ra) of, for example, about 0.001 μm after being polished. In the present embodiment, the acceleration voltage of the SEM is set to 20 kV, and the magnification of the SEM is set to 500.

An SEM image is acquired for each of the 20 regions 32 and analyzed using known image analysis software (for example, WinROOF (registered trademark) manufactured by Mitani Corporation). In the image analysis, the SEM image is calibrated for size based on a scale bar on the SEM image, and then is binarized. The SEM image is binarized by classifying the brightness (luminosity) of each pixel thereof into two levels using a predetermined threshold (for example, 118). In other words, a pixel whose brightness is lower than or equal to the threshold is classified as having a brightness of zero, and a pixel whose brightness is greater than the threshold is classified as having a brightness of "255". A binarized image is obtained by classifying the brightness of each pixel into two levels and eliminating intermediate levels.

FIG. 3 is an enlarged schematic diagram illustrating the binarized image of the sectional surface of the insulator 11. In FIG. 3, black regions are the pores, and white regions are other portions (ceramic particles and particle boundaries). The binarized image of each region 32 is analyzed by a known image analysis method to extract all pores (voids) in the region 32, and the area of each of the extracted pores is determined. The percentage (%) obtained by dividing the total area of all the pores in the 20 regions 32 by the area of the rectangle 25 is the porosity of the insulator 11. The porosity of the insulator 11 is set to 5% or less. The reason for this is to ensure that the insulator 11 has satisfactory mechanical strength.

Next, among all the pores in each region 32, 10 pores having the largest areas are selected. The 10 pores having the largest areas selected for each region 32 are referred to as specific pores. The rectangle 25 includes 200 specific pores. The total area of the specific pores is determined for each region 32, and the average of the 20 regions 32 is determined. The insulator 11 is structured such that the average of the 20 regions 32 regarding the total area of the specific pores determined for each of the 20 regions 32, that is, the value obtained by dividing the total area of the 200 specific pores by 200 and rounding the quotient to the first decimal place, is 26.3 $\mu m^2$ or less. The reason for this is to limit the size of large pores (specific pores) that may allow intrusion of the alkaline component leading to a reduction in the insulating field strength, and thereby reduce intrusion of the alkaline component.

The distribution of the specific pores is also determined by a known image analysis method. The insulator 11 is structured such that the specific pores include no more than 30 pores having areas of 37 $\mu m^2$ or more. The reason for this is to limit the number of large pores that may allow intrusion of the alkaline component leading to a reduction in the insulating field strength, and thereby reduce intrusion of the alkaline component. The insulator 11 is structured such that the specific pores include no less than eight pores having areas of 51 $\mu m^2$ or more. The reason for this is to provide a sufficient number of particularly large pores to ensure that the insulator 11 has satisfactory thermal shock properties.

As illustrated in FIG. 3, a distance L between pores 33 and 34, which are specific pores having areas of 37 $\mu m^2$ or more, is determined by a known image analysis method. When the distance L between the pores 33 and 34 having areas of 37 $\mu m^2$ or more is determined, it is necessary not only to determine the distance L between the pores in each region 32 but also to determine the distance L between the pores in different regions 32 across a boundary between the regions 32. The insulator 11 is structured such that the distance L is 36.3 μm or more. This is because intrusion of the alkaline component can be further reduced when large pores that may allow intrusion of the alkaline component c a reduction in the insulating field strength are separated from each other.

An example of a method for manufacturing the insulator 11 will now be described. The insulator 11 is manufactured by slurry preparation, deaeration, granulation, molding, grinding, and sintering processes. These processes will now be described.

The slurry preparation process is a process of producing slurry by mixing raw material powder, a binder, and a solvent. The raw material powder mainly contains powder of a chemical compound that converts to alumina when sintered (hereinafter referred to as "AI compound powder"). The AI compound powder may be, for example, alumina powder.

The slurry preparation process includes a pulverizing process for mixing and pulverizing the raw material powder. The pulverizing process is performed by using a wet pulverizer, such as a ball mill. The diameter of balls used in the wet pulverizer is not particularly limited as long as the object of the present invention can be achieved, and is preferably 2 mm or more and 20 mm or less, more preferably 2 mm or more and 10 mm or less, and still more preferably 2 mm or more and 6 mm or less. The balls may include two or more types of balls having different diameters. The raw material powder produced by the pulverizing process has a grain size with a small variation and a narrow grain-size distribution. The raw material powder may be used to control the distribution and number of pores in the alumina-based sintered body obtained by the sintering process and increase the sintered density.

The grain size (grain size after pulverization) of the AI compound powder (for example, alumina powder) is not particularly limited as long as the object of the present invention can be achieved and may be, for example, preferably 1.5 μm or more, more preferably 1.7 μm or more, and preferably 2.5 μm or less, more preferably 2.0 μm or less. When the grain size of the AI compound powder is in these ranges, the number of defective insulators can be reduced and an appropriate sintered density can be achieved. The grain size is a volume-based median diameter (D50) measured by the laser diffraction method using a Micotrac grain-size distribution analyzer (product name "MT-3000") available from Nikkiso Co., Ltd.

When the mass of the alumina-based sintered body obtained after the sintering process (in terms of oxide) is 100% by mass, the mass of the prepared AI compound powder in terms of oxide is preferably 90% by mass or more, more preferably 90% by mass or more and 98% by mass or less, and still more preferably 90% by mass or more and 97% by mass or less. The raw material powder may contain powder other than the AI compound powder as long as the object of the present invention can be achieved.

The binder is added to the slurry to improve the moldability of the raw material powder. Examples of the binder include hydrophilic binding agents, such as polyvinyl alcohol, aqueous acrylic resin, gum Arabic, and dextrin. These examples may be used alone, or two or more of them may be used in combination. The amount of the binder is not particularly limited as long as the object of the present invention can be achieved, and may be, for example, 1 to 10 parts by mass, preferably 3 to 7 parts by mass, for 100 parts by mass of the raw material powder.

The solvent is used, for example, to disperse the raw material powder. Examples of the solvent include water and alcohols. These examples may be used alone, or two or more of them may be used in combination. The amount of the solvent is not particularly limited as long as the object of the present invention can be achieved, and may be, for example, 23 to 40 parts by mass, preferably 25 to 35 parts by mass, for 100 parts by mass of the raw material powder. The slurry may contain components other than the raw material powder, the binder, and the solvent as necessary. The slurry may be mixed by, for example, a known stirring and mixing device.

The prepared slurry may be deaerated as necessary. In the deaeration process, for example, a container containing the slurry after the mixing (kneading) process is placed in a vacuum deaeration device and exposed to a low-pressure environment by reducing the pressure. As a result, air is removed from the slurry. The amount of air in the slurry can be determined by comparing the densities of the slurry before and after the deaeration.

The granulation process is a process of forming the slurry containing the raw material powder into spherical granulated powder. The method of forming the slurry into the granulated powder is not particularly limited as long as the object of the present invention can be achieved, and may be, for example, a spray drying method. In the spray drying method, a predetermined spray drier is used to spray-dry the slurry to obtain the granulated powder having a predetermined grain size. The grain size of the granulated powder is not particularly limited as long as the object of the present invention can be achieved. For example, preferably, 212 μm pass ≥95% or less, and more preferably, 180 μm pass ≥95% or less.

The molding process is a process of forming a molded product by molding the granulated powder into a predetermined shape using a mold. The molding process is performed by, for example, rubber press molding or metallic-mold press molding. In the present embodiment, the mold (for example, inner and outer rubber mold members of a rubber press molding device) receives a pressure (pressure increase rate) adjusted to increase stepwise from the outside. The pressure is preferably adjusted to be in a range higher than the pressure according to the related art (for example, 100 MPa or more). The upper limit of the pressure is not particularly limited as long as the object of the present invention can be achieved. For example, the pressure may be adjusted to, for example, 200 MPa or less.

The grinding process is a process of removing excess parts of the molded product obtained as a result of the molding process and polishing the surface of the molded product. In the grinding process, a resinoid grinding wheel or the like is used to remove the excess parts or polish the surface of the molded product. The grinding process is performed to refine the shape of the molded product.

The sintering process is a process of sintering the molded product whose shape has been refined in the grinding process to obtain an insulator. In the sintering process, for example, the molded product is sintered in the atmosphere at a temperature of higher than or equal to 1450° C. and lower than or equal to 1650° C. for one to eight hours. After the sintering process, the molded product is quenched to obtain the insulator 11 composed of the alumina-based sintered body.

Example

The present invention will now be described in further detail by way of an example. However, the present invention is not limited to this example.

Production of Insulator

Insulators having basically the same structure as that of the insulator 11 included in the spark plug 10 according to the above-described embodiment were produced. Four insulators were produced for each of Sample Nos. 1 to 17 by a method similar to that in the embodiment. The radial thickness of the insulator 11 at the front end of the first hole 13 was 3 mm. The insulators of Sample No. 1 were produced by performing the slurry preparation process such that the raw material powder was pulverized with the wet pulverizer by using 2-mm-diameter balls and 6-mm-diameter balls mixed at a ratio of 50% by mass to 50% by mass. The insulators of Sample Nos. 2 to 8 were produced by a method similar to that for producing the insulators of Sample No. 1 except that the ratio between the types of balls used to pulverize the raw material powder in the slurry preparation process was changed as appropriate.

The insulators of Sample No. 9 were produced by performing the slurry preparation process such that the raw material powder was pulverized with the wet pulverizer by using 8-mm-diameter balls and 12-mm-diameter balls mixed at a ratio of 50% by mass to 50% by mass. The insulators of Sample Nos. 10 to 15 and 17 were produced by a method similar to that for producing the insulators of Sample No. 9 except that the ratio between the types of balls used to pulverize the raw material powder in the slurry preparation process was changed as appropriate. The insulators of Sample No. 16 were produced by a method similar to that for producing the insulators of Sample No. 1 except that the raw material powder contained a larger amount of silica and that the pressure applied in the molding process was greater than that in the molding process for the insulators of Sample No. 1.

Dielectric Strength Test

Among the four insulators of each of Sample Nos. 1 to 17, two were used to produce two samples of the spark plug 10 according to the above-described embodiment. One sample was subjected to a dielectric strength test as specified in JIS B8031:2006. The ground electrode 24 was removed to prevent discharge between the center electrode 16 and the ground electrode 24, and then the metal shell 23 was clamped in a pressure chamber at a specified torque. Carbonic acid gas was supplied to the pressure chamber, and the pressure in the pressure chamber was set to approximately 5 MPa. After that, the voltage applied between the metal terminal 19 and the metal shell 23 of the sample was increased from 0 V at a rate of 0.1 kV/sec, and the dielectric breakdown voltage at the time of penetration through the insulator 11 was determined. The dielectric breakdown voltage was in the range of 40 kV to 42 kV.

The other sample was placed in a furnace maintained at approximately 200° C. after removing the ground electrode 24 to prevent discharge between the center electrode 16 and the ground electrode 24 and covering a front end portion of the insulator 11 with a heat-resistant insulating tube. Then, a voltage of 35 kV was applied between the metal terminal 19 and the metal shell 23 for 100 hours. The reason for this is to place the sample in an environment where the insulator 11 is easily corroded by alkaline components contained in the sealing material 20 surrounding the head portion 17 of the center electrode 16. The presence or absence of alkali corrosion can be determined by determining the presence or absence of alkali metals, such as Na, and alkaline earth metals on the insulator 11 by using an electron probe microanalyzer (EPMA).

The sample was taken out from the furnace, and then was subjected to a dielectric strength test as specified in JIS B8031:2006. The metal shell 23 was clamped in a pressure chamber at a specified torque. Carbonic acid gas was supplied to the pressure chamber, and the pressure in the pressure chamber was set to approximately 5 MPa. After that, the voltage applied between the metal terminal 19 and the metal shell 23 of the sample was increased from 0 V at a rate of 0.1 kV/sec, and the dielectric breakdown voltage at the time of penetration through the insulator 11 was determined. The sample was evaluated based on the dielectric breakdown voltage after the alkali corrosion and graded as follows: A for 38 kV or more, B for 36 kV or more and less than 38 kV, C for 33 kV or more and less than 36 kV, and D for less than 33 kV. Table 1 shows the results in the "Insulating Field Strength" column.

Observation of Sectional Surface of Insulator

Among the four insulators 11 of each of Sample Nos. 1 to 17, one was cut along a plane including the center line X of the axial hole 12. The sectional surface of the insulator 11 was mirror polished, and the structure of the polished surface was observed using an SEM (JEM-IT300LA manufactured by JEOL Ltd.). Ten rectangular regions 32 (regions having long sides with a length of 255 μm and short sides with a length of 195 μm) were set such that the short sides thereof were in contact with the first hole 13 in the insulator 11. Another 10 regions 32 were set on the outer sides of the first 10 regions 32 in the radial direction. Then, 20 SEM images corresponding to the 20 regions 32 were acquired and processed by using picture processing software WinROOF2013 (WinROOF is a registered trademark). Thus, the percentage of the total area of pores appearing in the entire region (rectangle 25) including the 20 regions 32 to the area of the rectangle 25 (porosity) was determined. The porosities of the insulators 11 of Sample Nos. 1 to 17 were 5% or less.

Among all the pores in each region 32, 10 pores having the largest areas were selected by image analysis, and the total area of the selected 10 pores (specific pores) was determined for each region 32. Then, the average of the 20 regions 32 (rounded to the first decimal place) was determined. Table 1 shows the results in the "Area of Specific Pores" column.

The number of specific pores having areas of 37 $\mu m^2$ or more and the number of specific pores having areas of 51 $\mu m^2$ or more were determined by image analysis. The total numbers of these pores were determined by adding the numbers for the 20 regions 32. Table 1 shows the results in the "Pores of 37 $\mu m^2$ or More" and "Pores of 51 $\mu m^2$ or More" columns.

Among the specific pores appearing in the rectangle 25, pairs of pores having areas of 37 $\mu m^2$ or more were selected by image analysis, and the distance L between each of the selected pairs of pores having areas of 37 $\mu m^2$ or more was determined. Table 1 shows the shortest of all the distances L in the "Distance Between Pores" column.

Thermal Shock Test

The insulators 11 of Sample Nos. 1 to 17 were placed in a constant temperature bath maintained at a predetermined temperature for 30 minutes, and then immediately placed in water at 20° C. for rapid cooling. The insulator 11 was put into the water in a position such that the center line X of the axial hole 12 of the insulator 11 was parallel to the water surface. The insulator 11 was taken out from the water and visually checked for the presence or absence of a crack by applying liquid for penetrant inspection. The temperature in the constant temperature bath in which the insulator 11 was placed was increased from 150° C. in steps of 10° C. until a crack was found on the insulator 11. A critical temperature difference was determined as the difference between the temperature in the constant temperature bath and the water temperature (20° C.) when a crack was found on the insulator 11. The samples were graded based on the critical temperature difference as follows: A for 210° C. or higher, and D for lower than 210° C. Table 1 shows the results in the "Thermal Shock Properties" column.

TABLE 1

| No. | Area of Specific Pores ($\mu m^2$) | Pores of 37 $\mu m^2$ or More (number) | Pores of 51 $\mu m^2$ or More (number) | Distance Between Pores (μm) | Insulating Field Strength | Thermal Shock Properties |
|---|---|---|---|---|---|---|
| 1 | 21.9 | 17 | 10 | 47.2 | A | A |
| 2 | 21.5 | 16 | 8 | 36.3 | A | A |
| 3 | 10.3 | 16 | 10 | 66.7 | A | A |
| 4 | 26.3 | 29 | 25 | 36.3 | A | A |
| 5 | 26.3 | 30 | 18 | 62.3 | A | A |
| 6 | 10.7 | 30 | 25 | 49.7 | A | A |
| 7 | 26.1 | 15 | 10 | 37.2 | A | A |
| 8 | 25.9 | 26 | 12 | 33.6 | B | A |
| 9 | 26.3 | 31 | 15 | 30.0 | C | A |
| 10 | 22.0 | 35 | 10 | 35.8 | C | A |
| 11 | 50.3 | 50 | 35 | 32.0 | D | A |
| 12 | 28.2 | 45 | 16 | 23.0 | D | A |
| 13 | 26.4 | 31 | 7 | 22.3 | D | D |
| 14 | 38.9 | 73 | 37 | 6.8 | D | A |
| 15 | 29.6 | 37 | 19 | 28.6 | D | A |
| 16 | 11.1 | 1 | 0 | — | A | D |
| 17 | 33.8 | 48 | 33 | 2.6 | D | A |

As is clear from Table 1, the samples of Nos. 1 to 8 and 16, for which the average area of the specific pores was 26.3 $\mu m^2$ or less and the number of pores having areas of 37 $\mu m^2$ or more was 30 or less, were graded A or B for the insulating field strength. The samples of Nos. 11-15 and 17, for which the average area of the specific pores was greater than 26.3 $\mu m^2$, were graded D for the insulating field strength. Samples of Nos. 9 and 10, for which the average area of the specific pores was 26.3 $\mu m^2$ or less but the number of pores having areas of 37 $\mu m^2$ or more was more than 30, was graded C for the insulating field strength. This shows that the average area of the specific pores in the insulator 11 being 26.3 $\mu m^2$ or less is a necessary condition for the insulating field strength to be grade A or B, and the number of the pores having areas of 37 $\mu m^2$ or more being 30 or less is a sufficient condition for the insulating field strength to be grade A or B.

The samples of Nos. 1 to 12, 14, 15, and 17, for which the number of pores having areas of 51 $\mu m^2$ or more was eight or more, were graded A for the thermal shock properties. The samples of Nos. 13 and 16, for which the number of pores having areas of 51 $\mu m^2$ or more was 7 or less, were graded D for the thermal shock properties. This shows that when the number of pores having areas of 51 μm$^2$ or more is eight or more, the critical temperature difference of the insulator 11 can be increased, that is, the resistance to rapid cooling can be increased. This may be because the pores serve to reduce the tensile stress generated in the insulator 11 during rapid cooling.

For samples of Nos. 1 to 8, the insulating field strength was grade A or B, and the thermal shock properties were grade A. This shows that, in order for the spark plug 10 used in a high-temperature environment to have satisfactory insulating field strength and thermal shock properties, it is effective to set the porosity of the insulator 11 to 5% or less, the average area of the specific pores to 26.3 μm$^2$ or less, the number of pores having areas of 37 μm$^2$ or more to 30 or less, and the number of pores having areas of 51 μm$^2$ or more to eight or more.

For samples of Nos. 1 to 7, both the insulating field strength and the thermal shock properties were grade A. This shows that, to ensure satisfactory insulating field strength and thermal shock properties, it is particularly effective to set the porosity of the insulator 11 to 5% or less, the average area of the specific pores to 26.3 μm$^2$ or less, the number of pores having areas of 37 μm$^2$ or more to 30 or less, the number of pores having areas of 51 μm$^2$ or more to eight or more, and the distance between the pores having areas of 37 μm$^2$ or more to 36.3 μm or more.

Although the present invention has been described based on an embodiment, the present invention is not limited to the above-described embodiment in any way, and it can be easily understood that various improvements and modifications are possible without departing from the spirit of the present invention. For example, the shape and size of the head portion 17 of the center electrode 16 are examples and may be set as appropriate.

Although the resistor 21 is disposed in the insulator 11 in the spark plug 10 according to the above-described embodiment, the spark plug is not limited to this. The structure of the embodiment may, of course, be applied to a spark plug including no resistor 21. This is because effects similar to those of the above-described embodiment can be obtained as long as the head portion 17 of the center electrode 16 is fixed by the sealing material 20.

Although the spark plug 10 is installed in an engine (not illustrated) such that the ground electrode 24 is exposed in the combustion chamber in the above-described embodiment, the spark plug is not limited to this. The structure of the embodiment may, of course, be applied to a spark plug in which the ground electrode 24 is covered with a plug cap having a through hole (spark plug having a pre-chamber in the combustion chamber).

Although a spark discharge occurs between the center electrode 16 and the ground electrode 24 in the spark plug 10 according to the above-described embodiment, the spark plug is not limited to this. The structure of the embodiment may, of course, be applied to a spark plug that utilizes the non-equilibrium plasma generated around the leg portion 18 of the center electrode 16.

DESCRIPTION OF REFERENCE NUMERALS

10 spark plug
11 insulator
12 axial hole
13 first hole
14 connecting portion
15 second hole
16 center electrode
20 sealing material
25 rectangle
26 long side
27 front end of long side
28 rear end of long side
30,31 short side
32 region
X center line

What is claimed is:

1. A spark plug comprising:

an insulator having an axial hole including a first hole and a second hole with a diameter smaller than a diameter of the first hole, the first hole and the second hole being connected to each other in an axial direction with a connecting portion provided therebetween;

a center electrode extending from the first hole toward a front end of the spark plug through the second hole; and a sealing material disposed in a rear end region around the center electrode in the insulator, wherein, on any cross section including a center line of the axial hole, a rectangle that is 1920 μm long in the axial direction and 510 μm long in a radial direction is set in the insulator, one of long sides of the rectangle having a front end in contact with a front end of the first hole and a rear end in contact with the first hole, wherein pores appear in the rectangle, wherein a ratio of an area of the pores that appear in the rectangle to an area of the rectangle is 5% or less and greater than 0%, wherein the rectangle is divided into 20 equal regions in the insulator by dividing each of short sides of the rectangle into two equal parts and dividing each of the long sides of the rectangle into 10 equal parts, wherein pores appear in each of the regions, wherein, among the pores that appear in each of the regions, 10 pores having largest areas are selected as specific pores, wherein the specific pores have an average area of 26.3 μm$^2$ or less and greater than 0 μm$^2$, and wherein the specific pores include no more than 30 pores having areas of 37 μm$^2$ or more and at least eight pores having areas of 51 μm$^2$ or more.

2. The spark plug according to claim 1, wherein the specific pores having areas of 37 μm$^2$ or more are separated from each other by a distance of 36.3 μm or more.

* * * * *